(12) United States Patent
Nwosu

(10) Patent No.: US 11,762,381 B2
(45) Date of Patent: Sep. 19, 2023

(54) REMOTE CONTROL CAR-SHAPED SUITCASE APPARATUS

(71) Applicant: Celestina Nwosu, Amarillo, TX (US)

(72) Inventor: Celestina Nwosu, Amarillo, TX (US)

( * ) Notice: Subject to any disclaimer, the term of this patent is extended or adjusted under 35 U.S.C. 154(b) by 392 days.

(21) Appl. No.: 17/203,829

(22) Filed: Mar. 17, 2021

(65) Prior Publication Data

US 2022/0299990 A1  Sep. 22, 2022

(51) Int. Cl.
*A45C 5/03* (2006.01)
*G05D 1/00* (2006.01)
*A45C 13/26* (2006.01)
*A45C 13/10* (2006.01)
*A45C 5/14* (2006.01)

(52) U.S. Cl.
CPC ............. *G05D 1/0011* (2013.01); *A45C 5/03* (2013.01); *A45C 5/14* (2013.01); *A45C 13/103* (2013.01); *A45C 13/262* (2013.01); *A45C 2013/267* (2013.01)

(58) Field of Classification Search
CPC .... A45C 5/00; A45C 9/00; A45C 7/00; A45C 5/03; A45C 5/14; A45C 13/103; A45C 13/262; A45C 2013/267; A45F 3/042; G05D 1/0011
USPC .......................................................... 180/167
See application file for complete search history.

(56) References Cited

U.S. PATENT DOCUMENTS

| | | |
|---|---|---|
| 572,477 A | 12/1890 | Edwards |
| D346,274 S | 4/1994 | Good |
| 5,316,096 A | 5/1994 | Good |
| D486,037 S * | 2/2004 | Corzo ........................... D7/606 |
| 7,350,607 B2 | 4/2008 | Park |
| 7,681,412 B1 * | 3/2010 | Arroyo ................ B65D 81/365 220/592.2 |
| D651,796 S * | 1/2012 | Colchiesqui .............. D3/271.12 |
| D651,797 S * | 1/2012 | Colchiesqui .............. D3/271.12 |
| D651,798 S * | 1/2012 | Colchiesqui .............. D3/271.12 |
| 8,434,577 B1 | 5/2013 | Al-Qaffas |
| 2002/0017411 A1* | 2/2002 | Weiss ..................... A45C 11/02 180/167 |
| 2003/0168371 A1* | 9/2003 | Weimer ............. B65D 81/3813 206/457 |
| 2004/0129469 A1 | 7/2004 | Kader |
| 2007/0034424 A1 | 2/2007 | Snowden |
| 2007/0131462 A1 | 6/2007 | Hemsley |
| 2010/0154456 A1* | 6/2010 | Wilkins ................... A45C 5/00 62/331 |

(Continued)

*Primary Examiner* — James A Shriver, II
*Assistant Examiner* — Hilary L Johns

(57) ABSTRACT

A remote control car-shaped suitcase apparatus for stylish and convenient transportation of luggage includes an electric motor housed in a motor compartment of a base plate. A battery, a CPU, and a transceiver are coupled within the motor compartment and are in operational communication with the electric motor. A pair of front wheels and a pair of back wheels are coupled to the base plate. Each of the pair of back wheels is in operational communication with the electric motor. A handle is slidably engaged within a handle aperture of the base plate. A suitcase body is coupled to the base plate and represents a car. The suitcase body has a suitcase top side defining a suitcase main cavity with the base plate. The suitcase top side is hingingly coupled to a suitcase right side and has a first zipper to seal and alternatively unseal the suitcase main cavity.

10 Claims, 5 Drawing Sheets

(56) References Cited

U.S. PATENT DOCUMENTS

| | | | | |
|---|---|---|---|---|
| 2011/0256792 | A1* | 10/2011 | Silver | A45C 9/00 |
| | | | | 190/18 A |
| 2016/0242518 | A1* | 8/2016 | Kennedy | A45C 5/14 |
| 2016/0255928 | A1* | 9/2016 | O'Donnell | A45C 5/14 |
| 2017/0188679 | A1* | 7/2017 | Jacob | A45C 13/42 |
| 2018/0184777 | A1* | 7/2018 | Hong | A45C 5/03 |
| 2020/0187617 | A1* | 6/2020 | Melkebeke | A45C 5/146 |
| 2021/0000235 | A1* | 1/2021 | Osseiran | H04W 4/029 |
| 2021/0052049 | A1* | 2/2021 | Zheng | A45C 13/36 |
| 2021/0056788 | A1* | 2/2021 | Chen | G05D 1/0214 |
| 2022/0160087 | A1* | 5/2022 | Munoz | A45C 13/262 |

* cited by examiner

REMOTE CONTROL CAR-SHAPED SUITCASE APPARATUS

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

(2) Description of Related Art Including Information Disclosed Under 37 CFR 1.97 and 1.98

The disclosure and prior art relates to suitcases and more particularly pertains to a new suitcase for stylish and convenient transportation of luggage.

(h) BRIEF SUMMARY OF THE INVENTION

An embodiment of the disclosure meets the needs presented above by generally comprising a base plate having a base front end, a base back end, a base right side, a base left side, a base bottom side, and a base top side. The base front end has a handle aperture extending between the base bottom side and the base top side. The base right side and the base left side each have a front wheel well depression and a back wheel well depression. The base plate defines a motor compartment between the base bottom side, the base top side, and the back wheel well depression of the base left side and the base right side. An electric motor is coupled to the base plate within the motor compartment. A battery is coupled to the base plate within the motor compartment and is in operational communication with the electric motor. A is CPU coupled to the base plate within the motor compartment and is in operational communication with the electric motor and the battery. A transceiver is coupled to the base plate within the motor compartment and is in operational communication with the CPU. The transceiver is configured to communicate with a smartphone. A pair of front wheels is coupled to the base plate. Each of the pair of front wheels has a front axle rotatably coupled within the front wheel well depression. A pair of back wheels is coupled to the base plate. Each of the pair of back wheels has a back axle rotatably coupled within the back wheel well depression and in operational communication with the electric motor. A handle is coupled to the base plate and is slidably engaged within the handle aperture. A suitcase body is coupled to the base plate. The suitcase body has a suitcase front side, a suitcase back side, a suitcase left side, a suitcase right side, and a suitcase top side defining a suitcase main cavity with the base plate. The suitcase top side is hingingly coupled to the suitcase right side and has a first zipper to selectively engage with the suitcase top side, the suitcase right side, and the base top side to seal and alternatively unseal the suitcase main cavity. The suitcase body represents a car.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
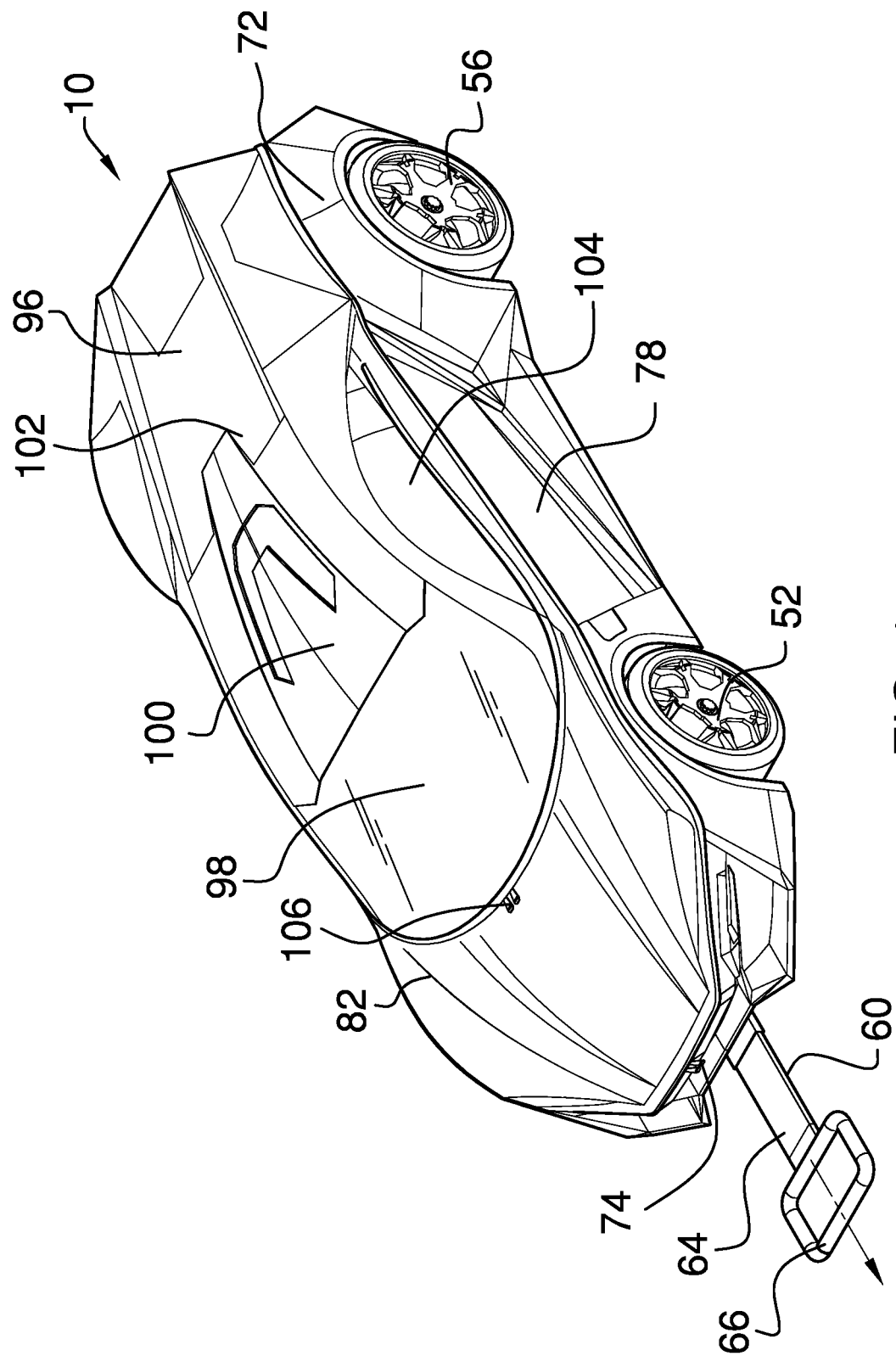
FIG. 1 is an isometric view of a remote control car-shaped suitcase apparatus according to an embodiment of the disclosure.
Figure 2:
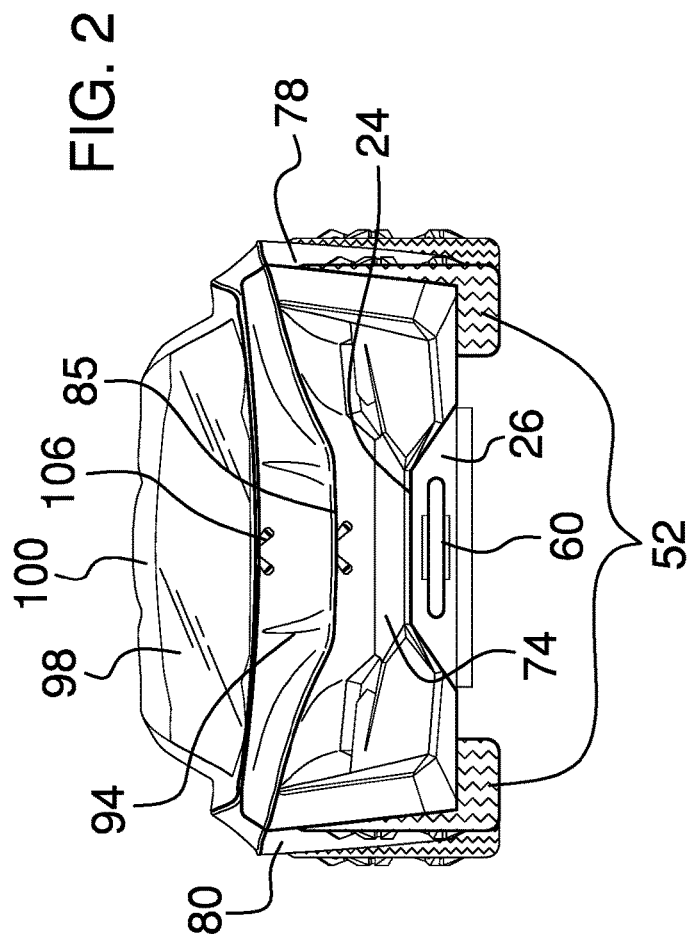
FIG. 2 is a front elevation view of an embodiment of the disclosure.
Figure 3:
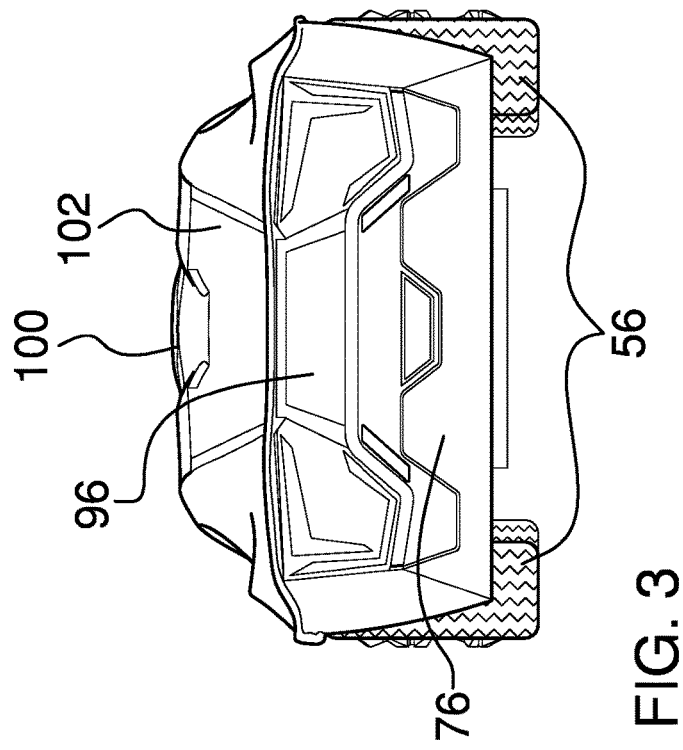
FIG. 3 is a rear elevation view of an embodiment of the disclosure.
Figure 4:
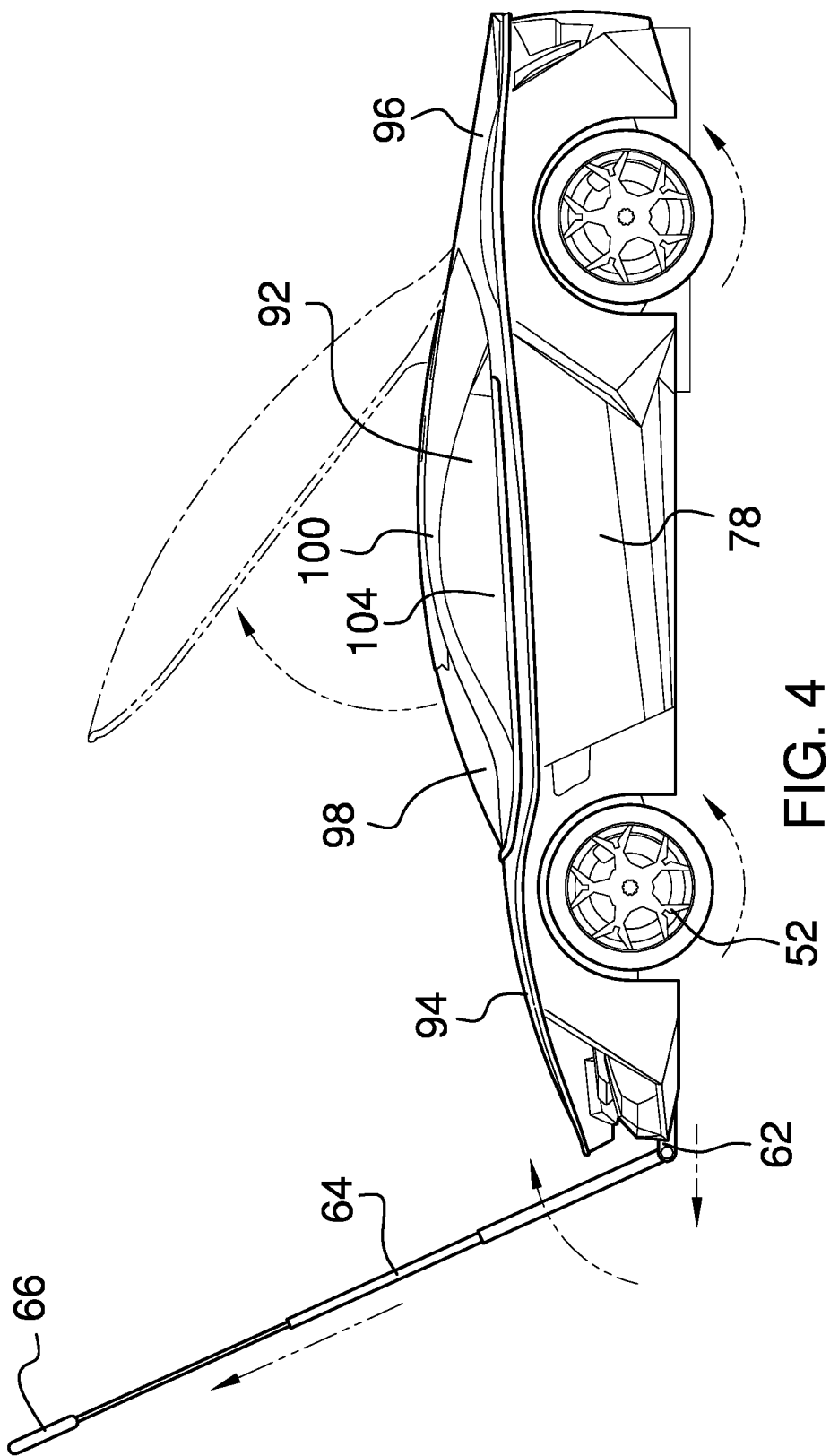
FIG. 4 is a side elevation view of an embodiment of the disclosure.
Figure 5:
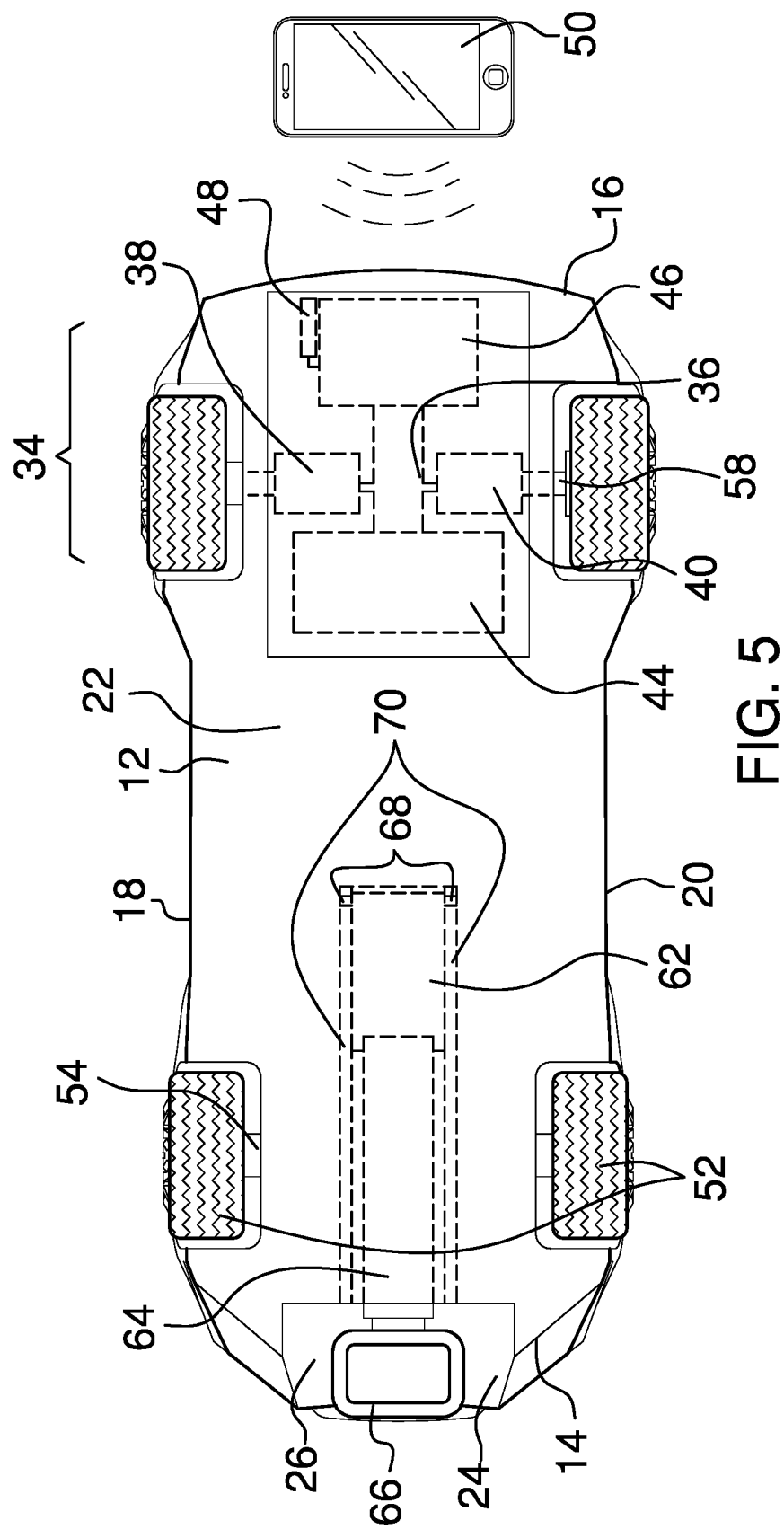
FIG. 5 is a bottom plan view of an embodiment of the disclosure.
Figure 6:
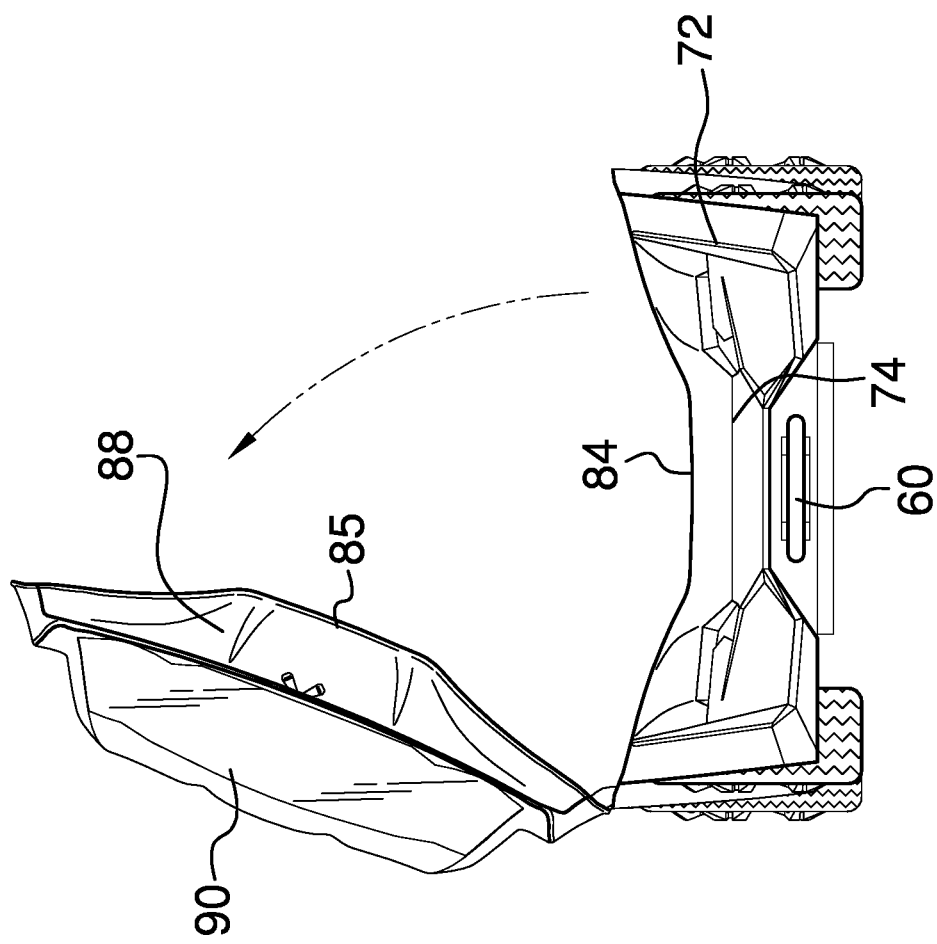
FIG. 6 is a front elevation in-use view of an embodiment of the disclosure.

With reference now to the drawings, and in particular to FIGS. 1 through 6 thereof, a new suitcase embodying the principles and concepts of an embodiment of the disclosure and generally designated by the reference numeral 10 will be described.

As best illustrated in FIGS. 1 through 6, the remote control car-shaped suitcase apparatus 10 generally comprises a base plate 12 having a base front end 14, a base back end 16, a base right side 18, a base left side 20, a base bottom side 22, and a base top side 24. The base front end 14 has a handle aperture 26 extending between the base bottom side 22 and the base top side 24. The handle aperture 26 may have a trapezoidal profile through the base front end 14 and a hexagonal profile through the base bottom side 22. The base right side 18 and the base left side 20 each have a front wheel well depression 28 and a back wheel well depression 30. The base plate 12 defines a motor compartment 32 between the base bottom side 22, the base top side 24, and the back wheel well depression 30 of the base left side 20 and the base right side 18. The base front end 14 is faceted, each of the base left side 20 and the base right side 18 have a flared portion 34 around the back wheel well depression 30, and the base back end 16 is rounded. An electric motor 36 is coupled to the base plate 12. The electric motor 36 may comprise a right motor 38 and a left motor 40 coupled within the motor compartment 32. A battery 44 is coupled to the base plate 12 within the motor compartment 32 and is in operational communication with the electric motor 36. A CPU 46 is coupled to the base plate 12 within the motor compartment 32 and is in operational communication with the electric motor 36 and the battery 44. A transceiver 48 is coupled to the base plate 12 within the motor compartment 32 and in operational communication with the CPU 46. The transceiver 48 is configured to communicate with a smartphone 50.

A pair of front wheels 52 is coupled to the base plate 12. Each of the pair of front wheels 52 has a front axle 54 rotatably coupled within the front wheel well depression 28. A pair of back wheels 56 is coupled to the base plate 12. Each of the pair of back wheels 56 has a back axle 58 rotatably coupled within the back wheel well depression 30. The right motor 38 and the left motor 40 are in operational communication with the back wheel 56 coupled within the back wheel well depression 30 of the base right side 18 and the base left side 20, respectively. A handle 60 is coupled to the base plate 12 and has a base portion 62. A telescopable extension portion 64 is hingingly coupled to the base portion 62 and a grip portion 66 is coupled to the extension portion 64. The base portion 62 has a pair of track pins 68 slidably engaged within a pair of track grooves 70 of the handle aperture 26. The grip portion 66 may be a rectangular loop.

A suitcase body 72 is coupled to the base plate 12 and has a suitcase front side 74, a suitcase back side 76, a suitcase left side 78, a suitcase right side 80, and a suitcase top side 82 defining a suitcase main cavity 84 with the base plate 12. The suitcase top side 82 is hingingly coupled to the suitcase right side 80 and has a first zipper 85 to selectively engage with the suitcase top side 82, the suitcase right side 80, and the base top side 24 to seal and alternatively unseal the suitcase main cavity 84. The suitcase body 72 represents a car. The suitcase top side 82 has a body portion 88 and a top portion 90 coupled to the body portion 88. The top portion 90 is hollow and defines a suitcase top cavity 92 with the body portion 88. The body portion 88 has a hood section 94 and a trunk section 96. The top portion 90 has a windshield section 98, a roof section 100, a back window section 102, and a pair of side window sections 104. The back window section 102 is hingingly coupled to the trunk section 96 and has a second zipper 106 to selectively engage the pair of side window sections 104 and the windshield section 98 with the body portion 88 to seal and alternatively unseal the suitcase top cavity 92.

In use, the suitcase main cavity 84 is loaded and the first zipper 85 is engaged and the suitcase top cavity 92 is loaded and the second zipper 106 is engaged. The user operates the electric motor 36 with her smartphone 50 communicating with the transceiver 48 to drive the apparatus 10. Alternatively the user may secure the grip portion 66 of the handle to drag the apparatus 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A remote control car-shaped suitcase apparatus comprising:
    a base plate, the base plate having a base front end, a base back end, a base right side, a base left side, a base bottom side, and a base top side, the base front end having a handle aperture extending between the base bottom side and the base top side, the base right side and the base left side each having a front wheel well depression and a back wheel well depression, the base plate defining a motor compartment between the base bottom side, the base top side, and the back wheel well depression of the base left side and the base right side;
    an electric motor coupled to the base plate, the electric motor being coupled within the motor compartment;
    a battery coupled to the base plate, the battery being coupled within the motor compartment and in operational communication with the electric motor;
    a CPU coupled to the base plate, the CPU being coupled within the motor compartment and in operational communication with the electric motor and the battery;
    a transceiver coupled to the base plate, the transceiver being coupled within the motor compartment and in operational communication with the CPU, the transceiver being configured to communicate with a smartphone;
    a pair of front wheels coupled to the base plate, each of the pair of front wheels having a front axle rotatably coupled within the front wheel well depression;
    a pair of back wheels coupled to the base plate, each of the pair of back wheels having a back axle rotatably coupled within the back wheel well depression and in operational communication with the electric motor;
    a handle coupled to the base plate, the handle being slidably engaged within the handle aperture; and
    a suitcase body coupled to the base plate, the suitcase body having a suitcase front side, a suitcase back side, a suitcase left side, a suitcase right side, and a suitcase top side defining a suitcase main cavity with the base plate, the suitcase top side being hingingly coupled to the suitcase right side and having a first zipper to selectively engage with the suitcase top side, the suitcase right side, and the base top side to seal and alternatively unseal the suitcase main cavity, the suitcase body representing a car.

2. The remote control car-shaped suitcase apparatus of claim 1 further comprising the suitcase top side having a body portion and a top portion coupled to the body portion, the top portion being hollow and defining a suitcase top cavity with the body portion, the body portion having a hood section and a trunk section, the top portion having a windshield section, a roof section, a back window section, and a pair of side window sections, the back window section being hingingly coupled to the trunk section and having a second zipper to selectively engage the pair of side window sections and the windshield section with the body portion to seal and alternatively unseal the suitcase top cavity.

3. The remote control car-shaped suitcase apparatus of claim 1 further comprising the handle having a base portion, an extension portion hingingly coupled to the base portion, and a grip portion coupled to the extension portion, the base portion being slidably engaged within the handle aperture.

4. The remote control car-shaped suitcase apparatus of claim 3 further comprising the base portion having a pair of track pins slidably engaged within a pair of track grooves of the handle aperture.

5. The remote control car-shaped suitcase apparatus of claim 3 further comprising the extension portion being telescopable.

6. The remote control car-shaped suitcase apparatus of claim 3 further comprising the handle portion being a rectangular loop.

7. The remote control car-shaped suitcase apparatus of claim 1 further comprising the base front end being faceted, each of the base left side and the base right side having a flared portion around the back wheel well depression, and the base back end being rounded.

8. The remote control car-shaped suitcase apparatus of claim 1 further comprising the electric motor comprising a right motor and a left motor, the right motor and the left motor being in operational communication with the back wheel coupled within the back wheel well depression of the base right side and the base left side, respectively.

9. The remote control car-shaped suitcase apparatus of claim 1 further comprising the handle aperture having a trapezoidal profile through the base front end and a hexagonal profile through the base bottom side.

10. A remote control car-shaped suitcase apparatus comprising:
   a base plate, the base plate having a base front end, a base back end, a base right side, a base left side, a base bottom side, and a base top side, the base front end having a handle aperture extending between the base bottom side and the base top side, the handle aperture having a trapezoidal profile through the base front end and a hexagonal profile through the base bottom side, the base right side and the base left side each having a front wheel well depression and a back wheel well depression, the base plate defining the motor compartment between the base bottom side, the base top side, and the back wheel well depression of the base left side and the base right side, the base front end being faceted, each of the base left side and the base right side having a flared portion around the back wheel well depression, and the base back end being rounded;
   an electric motor coupled to the base plate, the electric motor comprising a right motor and a left motor coupled within the motor compartment;
   a battery coupled to the base plate, the battery being coupled within the motor compartment and in operational communication with the electric motor;
   a CPU coupled to the base plate, the CPU being coupled within the motor compartment and in operational communication with the electric motor and the battery;
   a transceiver coupled to the base plate, the transceiver being coupled within the motor compartment and in operational communication with the CPU, the transceiver being configured to communicate with a smartphone;
   a pair of front wheels coupled to the base plate, each of the pair of front wheels having a front axle rotatably coupled within the front wheel well depression;
   a pair of back wheels coupled to the base plate, each of the pair of back wheels having a back axle rotatably coupled within the back wheel well depression, the right motor and the left motor being in operational communication with the back wheel coupled within the back wheel well depression of the base right side and the base left side, respectively;
   a handle coupled to the base plate, the handle having a base portion, a telescopable extension portion hingingly coupled to the base portion, and a grip portion coupled to the extension portion, the base portion having a pair of track pins slidably engaged within a pair of track grooves of the handle aperture, the grip portion being a rectangular loop; and
   a suitcase body coupled to the base plate, the suitcase body having a suitcase front side, a suitcase back side, a suitcase left side, a suitcase right side, and a suitcase top side defining a suitcase main cavity with the base plate, the suitcase top side being hingingly coupled to the suitcase right side and having a first zipper to selectively engage with the suitcase top side, the suitcase right side, and the base top side to seal and alternatively unseal the suitcase main cavity, the suitcase body representing a car, the suitcase top side having a body portion and a top portion coupled to the body portion, the top portion being hollow and defining a suitcase top cavity with the body portion, the body portion having a hood section and a trunk section, the top portion having a windshield section, a roof section, a back window section, and a pair of side window sections, the back window section being hingingly coupled to the trunk section and having a second zipper to selectively engage the pair of side window sections and the windshield section with the body portion to seal and alternatively unseal the suitcase top cavity.

\* \* \* \* \*